J. FITZPATRICK.
NUT LOCK.
APPLICATION FILED MAR. 1, 1919.
1,315,107.
Patented Sept. 2, 1919.
Fig. 1.
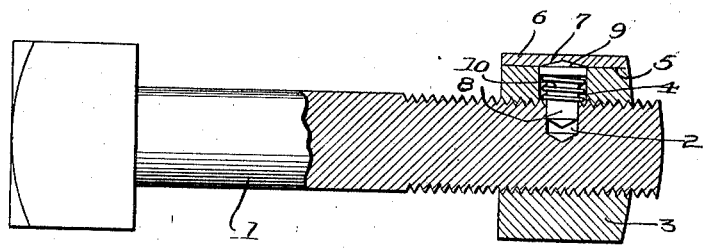
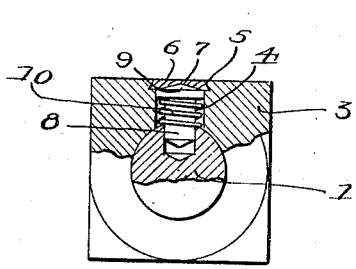
Fig. 2.
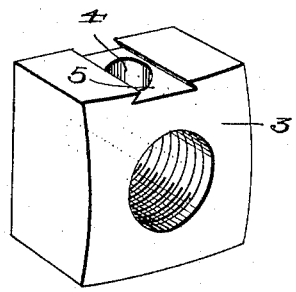
Fig. 3.
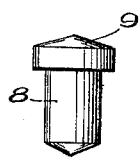
Fig. 4.
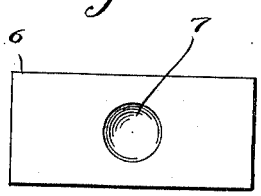
Fig. 5.
Witnesses
R. A. Thomas
Inventor
J. Fitzpatrick
By Victor J. Evans
Attorney

UNITED STATES PATENT OFFICE.

JOSEPH FITZPATRICK, OF SAN ANTONIO, TEXAS.

NUT-LOCK.

1,315,107.  Specification of Letters Patent.  Patented Sept. 2, 1919.

Application filed March 1, 1919. Serial No. 279,995.

*To all whom it may concern:*

Be it known that I, JOSEPH FITZPATRICK, a citizen of the United States, residing at San Antonio, in the county of Bexar and State of Texas, have invented new and useful Improvements in Nut-Locks, of which the following is a specification.

This invention relates to nut locks and it consists in the novel features hereinafter described and claimed.

An object of the invention is to produce a comparatively simple and inexpensive nut in which the nut may be readily applied to and removed from a bolt, one wherein the nut will be securely locked in applied position upon the bolt, and one in which the nut may be quickly and easily removed from the bolt.

A further object of the invention is to produce a nut lock in which when the nut is once in place it will be absolutely impossible for the same to work loose, as from jars or vibrations incident to use, and in which its removal, when desired, may be effected in an easy and ready manner, to provide a nut lock which, while being certain and effective in use, will be exceedingly simple of construction, easy to repair in case of injury, cheap to produce and of ready adaptation to position for use.

In the accompanying drawing:—

Figure 1 is a side view of a bolt and the nut with parts in section showing the lock applied.

Fig. 2 is an end view, parts being broken away and parts being in section.

Fig. 3 is a perspective view of the nut.

Fig. 4 is an elevation of the pin.

Fig. 5 is a plan view of the plate.

As illustrated in the accompanying drawing the bolt 1 is of usual form and is provided at its side and at a point between the ends of its thread with a socket 2. The nut 3 is adapted to be screwed upon the thread of the bolt 1 in a usual manner. The nut 3 is provided at one side with an aperture 4 and a groove 5 is provided at the edge of the nut and extends transversely across the outer end of the aperture 4. The edges of the groove 5 are undercut. A plate 6 is adapted to slide in the groove 5 and the plate is provided at its underside with a socket 7. A pin 8 is movably mounted in the aperture 4 and the lower end of the pin 8 is adapted to enter the socket 2 when the aperture 4 surrounds the said socket. The pin 8 is provided at its outer end with a cone shaped head 9, the outer portion of which is adapted to enter the socket 7 of the plate 6 when the plate is inserted in the groove 5. A spring 10 is interposed between the head 9 and the bolt 1 and is under tension with a tendency to maintain the outer portion of the head 9 in the socket 7 as best illustrated in Fig. 1 of the drawing.

It will be observed that the parts as illustrated in Fig. 1 of the drawing provide an effective nut lock inasmuch as the nut 3 is restrained against turning movement upon the bolt 1. When it is desired to remove the nut 3 from the bolt the plate 6 is moved longitudinally whereby an edge of the socket 7 moves over the pointed end portion of the head 9 and slightly depresses the pin 8 against the tension of the spring 10. Thus the pointed end of the head 9 is moved below the edge of the socket 7 and the plate 6 may be removed from the groove 5. The pin 8 may then be lifted out of the aperture 4 and consequently the nut 3 is free to rotate upon the threaded portion of the bolt 1. To assemble the parts of the nut lock in operation above described is reversed.

From the foregoing description taken in conjunction with the accompanying drawing, it will be seen that a nut lock of simple and durable structure is provided and that the same will be found of high efficiency in use for securely retaining the nut in position upon the bolt.

While the foregoing device is shown and described as being applied to a nut and bolt it is to be understood that the locking means may be used on other engageable objects as for instance the nuts and axles of automobile machines, wagons or vehicles of any kind. The nuts and the locking device may be of any desired size and shape and they may be composed of material suitably adapted for the purposes intended.

Having described the invention what is claimed is:—

In combination with a bolt provided at its sides with a socket, a nut engaging the bolt and provided with an aperture, said nut having a groove extending transversely across the aperture, a plate slidably mounted in the groove and provided at its underside with a socket, a pin movably mounted in the aperture of the nut and adapted to enter the socket in the bolt, said pin having a cone shaped head and a spring interposed between the head of the pin and the side of the bolt.

In testimony whereof I affix my signature.

JOSEPH FITZPATRICK.

Copies of this patent may be obtained for five cents each, by addressing the "Commissioner of Patents, Washington, D. C."